Aug. 28, 1962  P. WERNER ET AL  3,051,526
HINGE FITTING FOR SEATS
Filed Aug. 6, 1959  3 Sheets-Sheet 1

INVENTORS
Paul Werner and
Heinz Jung
by Michael S. Striker
Attorney

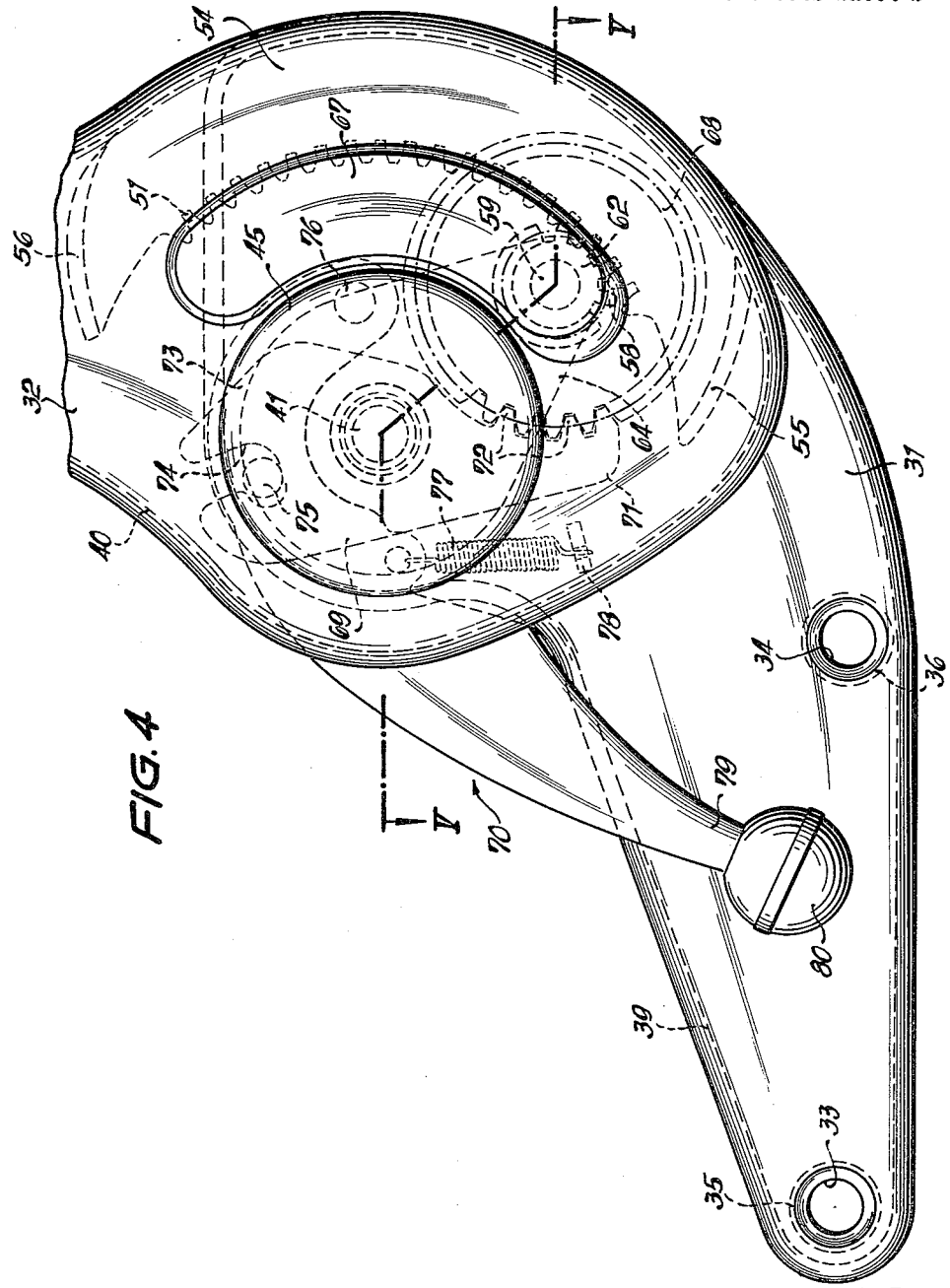

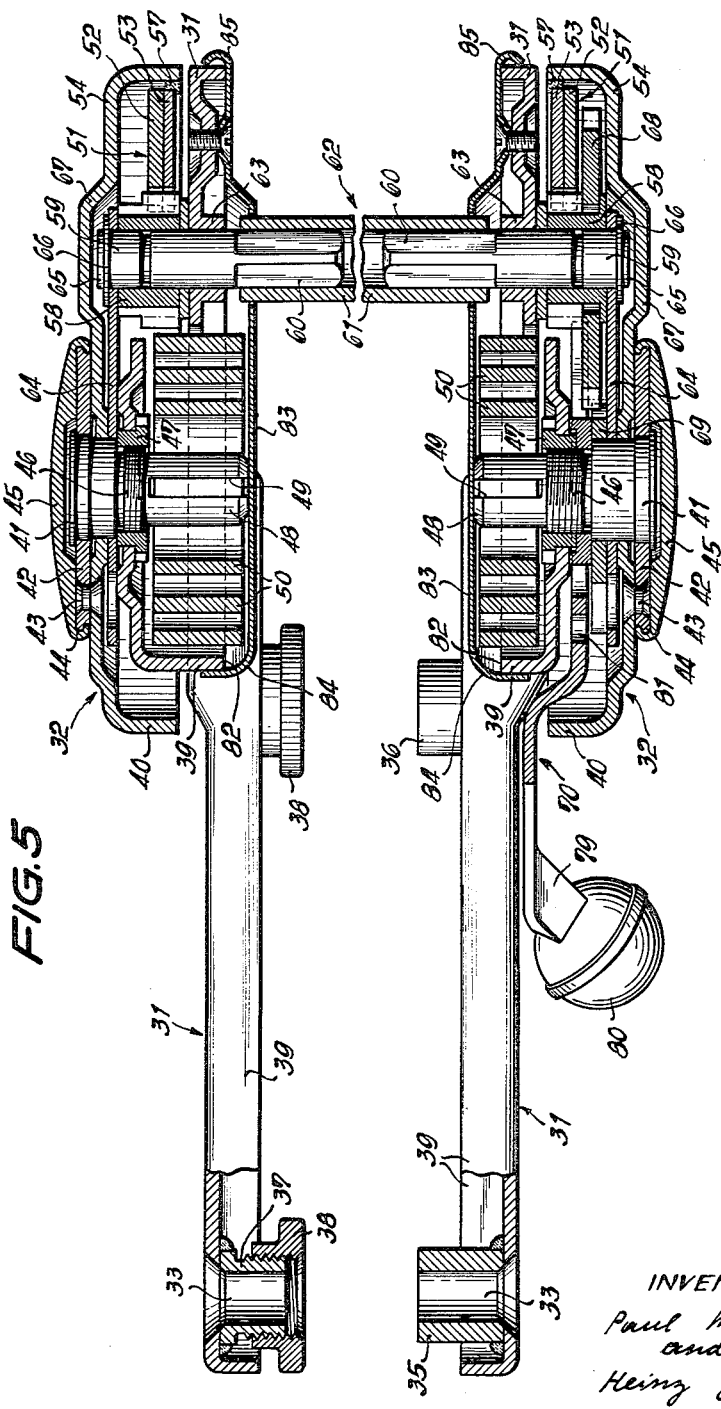

United States Patent Office 3,051,526
Patented Aug. 28, 1962

3,051,526
HINGE FITTING FOR SEATS
Paul Werner and Heinz Jung, Remscheid-Hasten, Germany, assignors to Fritz Keiper, Remscheid-Hasten, Germany
Filed Aug. 6, 1959, Ser. No. 832,004
Claims priority, application Germany Nov. 8, 1958
4 Claims. (Cl. 297—367)

This invention relates to hinge fittings, and more specifically to a hinge fitting for seats with adjustable back rest, particularly for seats in motor vehicles, comprising locking means and two pairs of articulated plate members, each pair being pivotally and arrestably connected together and consisting of a stationary plate member and a deflectable plate member, one plate member of each pair being provided with a rack segment engaged by a pinion and the two pinions being carried by a common shaft. It is an advantageous feature of hinge fittings of the afore-described kind that they permit the back rest of a seat to be freely and quickly titled into any desired position when the locking means are released. Nevertheless, known types of hinge fittings of the said kind still have certain drawbacks. For instance, the locking means are arranged to cooperate with one of the rack segments which is also engaged by one of the pinions. Owing to the particular construction of these known hinge fittings the angularity of the back rest cannot be adjusted in steps smaller than 5°. In actual practice it is often desirable that the back rest should be more precisely adjustable. Moreover, it is a drawback of these known types of hinge fittings that the teeth must have rather complex shapes, if they are to conform satisfactorily with practical functional requirements.

It is therefore the object of the present invention to improve hinge fittings for the back rests of seats of the afore-described kind by means which are both simple and cheap and more particularly to avoid the several drawbacks that have been set forth. At the same time the desirable advantages of known hinge fittings are to be retained.

The invention achieves the contemplated object by arranging the locking member to cooperate with a gear wheel mounted on the shaft which carries the pinions.

In the hinge fitting the invention proposes to provide, the locking member does not therefore directly engage one of the rack segments with which said pinions mesh, but an intermediate gear wheel of relatively larger diameter than that of the pinions. The envisaged form of construction permits the angular position of the back rest to be adjusted to practically any angle, and practical trials have shown that the angularity of the back rest can in fact be adjusted to within about 1°. The adjustability of the angularity of the back rest is therefore infinitely variable. On the other hand, the proposed form of construction permits the teeth of the gear wheel and of the rack segment to be of simple shape and formation, a factor which considerably facilitates their production.

Moreover, to avoid any tendency in the proposed form of construction of the plate members affixed to the back rest being torsionally deformed when subjected to an unevenly distributed load and of any such deformation causing the plate members on either side to be strained and to impair the satisfactory functioning of the mechanism resulting in jamming, it is further proposed to support the pinion in two bearings. This provision prevents any deformation of the highly loaded pinion shaft and the consequent jamming of the racking mechanism. The free end of the pinion shaft may be mounted in a strap member on the stationary plate member, which covers the pinion as well as possibly the gear wheel. Conveniently said strap member may be mounted on the pivot pin of the pair of articulated plate members. The dished portion of the movable plate member is arranged to have an arcuate embossment to provide a trough-like recess for the accommodation of the projecting end of the pinion shaft.

According to another proposal of the invention a locking means embodied in a cranked lever may be arranged to engage the gear wheel mounted coaxially and fast with the pinions. Conveniently the cranked lever provided with a grip may be accurately located by mounting it on the pivot pin for the articulated pair of plate members, preferably with the interposition of a bush. It is further advisable to provide a spring for loading the cranked lever, urging the same into locking position, said spring being fastened, on the one hand, to the stationary plate member of the hinge fitting and, on the other hand, to one arm of the cranked lever.

In order to provide a locking mechanism which will ensure that the hinge fitting remains reliably locked even when the driver brakes hard or the vehicle suddenly decelerates in an accident, so that a person sitting in the rear seat being propelled by the impact against the back rest of the seat in front will not cause the back rest to yield, assuming the hinge fitting is one rigidly secured to the seat and does not allow the back rest to be tilted forward, as is the case in some two door vehicles for the convenience of occupants of the rear seats when entering and alighting from the vehicle, it is further proposed to contrive the locking mechanism in such a way that it comprises a double-armed locking lever which is adapted to engage the locking gear wheel and which has a guide slot at its free end, and a spring-loaded actuating lever which is fitted with a grip, and which with a pin engages said guide slot, the locking lever being preferably mounted on the pivot pin of the articulated plate members, whereas the actuating lever has an arched arm with a grip at its end extending downwards to the level of the stationary plate member. In an arrangement of this kind the spring provided for loading the actuating lever need not be very powerful in order to prevent accidental release of the locking means, since considerable force is needed for the locking means in such a form of construction to be disengaged. Conveniently the spring for loading the actuating lever is attached to a projection on the stationary plate member of the hinge fitting, said projection at the same time providing an abutment for limiting the deflection of the locking lever. The projection may be provided by cutting out and bending over part of the plate member and thereby forming a lug. The gear wheel is naturally fast on the pinion shaft and the rack segment may consist of two adjacent curved strips of sheet metal riveted to the movable plate member with the interposition of a spacing strip.

To avoid the material of the upholstery from being damaged by wear the edges of the flanged marginal portions of the dished stationary plate member of the hinge fitting are covered with a protective capping at least adjacent the upholstered parts of the seat. Moreover, in order to compensate the unavoidable tolerances in the production of seat and back rest and to prevent that the parts of the fitting will be incorrectly mounted should there be differences in the dimensions of the parts of the seat, causing the members of the fitting to be bent and the satisfactory functioning of the fitting thereby impaired, it is further proposed to connect at least one of the stationary plate members with the frame of the seat with the interposition of a telescopically adjustable spacing bushing or the like. Conveniently the forward angular deflection of the back rest may be limited by the lug, or the like, to which one end of the spring for loading the actuating lever is attached, said lug therefore being contrived to serve as an abutment for the angular deflection of the deflectable plate member of the fitting.

Other features of the invention will emerge as the following description of two preferred embodiments of the invention proceeds.

In the accompanying drawings:

FIG. 4 is a side elevational view of another embodiment of a hinge fitting for fixation to the left-hand side of a vehicle seat, and FIG. 5 is a cross section taken on the line V—V in FIG. 4.

The drawings confine themselves to illustrating those parts of an adjustable seat which are necessary for a complete understanding of the present invention, irrelevant parts such as the actual seat and the back rest, which may be of any suitable conventional form of construction, being omitted.

Figure 1:
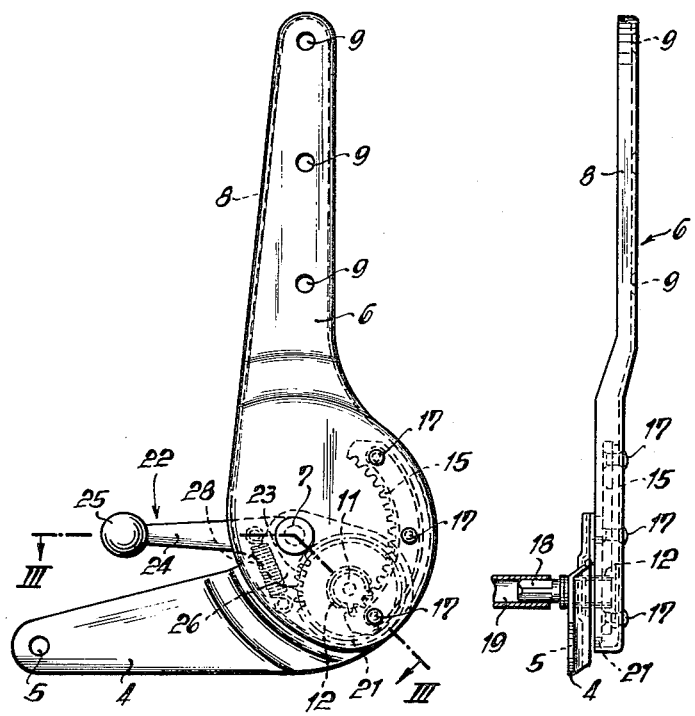
FIG. 1 is a side elevational view of plate members comprised in that part of a hinge fitting, which is located on the left-hand side on an adjustable motor vehicle seat.
Figure 2:
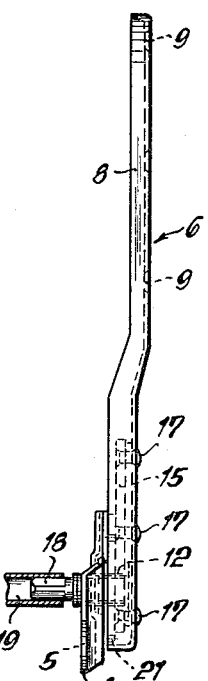
FIG. 2 is a front elevational view, partly in section, of the plate members of the hinge fitting shown in FIG. 1.

The assembly of the left hand hinge fitting shown in FIGS. 1 and 2 comprises a plate member 4 secured to the seat and a further plate member 6 secured to the back rest of a vehicle seat in a manner which will be later described. The forward end of the plate member 4 is provided with a hole 5 for a bolt which is not specially shown and upon which the entire fitting is adapted to pivot. This arrangement is a convenience for passengers entering the vehicle to take the rear seats as the entire fitting including the back rest of the front seat can be tipped forward without the need of first releasing the locking means. The plate member 6 which is affixed to the back rest is adapted to pivot about a pin 7, and is affixed to the plate member 4 on the side of the seat. It may be explained that the plate member 6 is slightly dished with a flanged substantially peripheral edge 8 facing the back rest, thus imparting additional rigidity to this plate member. The plate member 6 is provided with several holes 9 for the passage therethrough of fixing means, such as screws, three holes 9 being shown in the illustrated embodiment.

Figure 3:
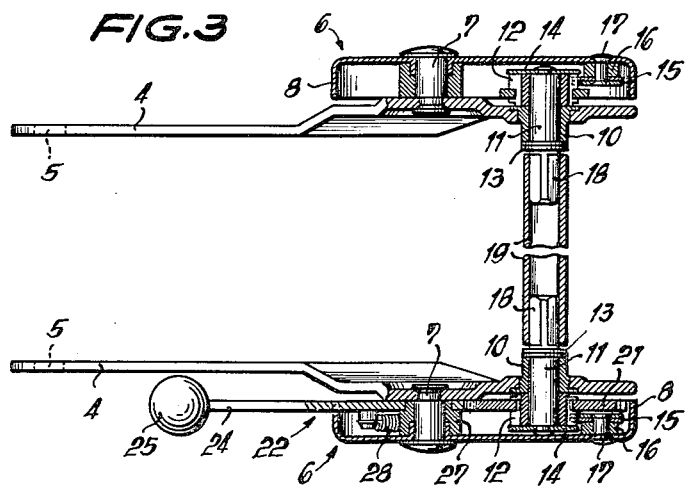
FIG. 3 is a cross section, on a slightly enlarged scale, of the hinge fitting taken on the line III—III in FIG. 1.

It will be seen from FIG. 3 that the plate member 4 is fitted with a bearing bush 10 engaged by part of a pinion shaft 11. This shaft is axially secured by locking rings 13 and a riveted disc 14. It may be mentioned that if desired the provision of a special bearing bush may be dispensed with and, instead, the plate member itself shaped in suitable manner for the reception of the shaft 11.

Between said bearing bush 10, shown in FIG. 3, and the disc 14 is a pinion 12, rigidly secured to the shaft 11, for instance by being keyed to the same. This pinion 12 meshes with a rack segment 15 which in the illustrated example comprises two curved strips of sheet metal secured by rivets 17 to the plate member 6 with the interposition of a spacing member 16. The shaft 11 is provided with a square end 18 which fits into a tube 19 with a corresponding square inside section. The pinion shaft 11 associated with the plate members on one side of the seat is thus connected with a second pinion shaft 11 associated with the plate members on the other side.

One of the pinion shafts 11 rigidly carries a gear wheel 21, the central bore of the gear wheel having for instance a non-circular section held by a similar section on the shaft. A locking device 22 substantially embodied in a cranked lever having a longer arm 24 and a shorter arm 26, cooperates with this gear wheel 21 which has a large diameter in relation to the pinion 12. The cranked lever pivots on a bush 27 which embraces the pivot pin 7. One arm, preferably the longer arm 24 of the cranked lever is fitted at its forward extremity with a grip 25 for the convenient operation of the locking device 22. On the other hand, the end of the shorter arm 26 is modified to form three or four teeth 23 which, as will be seen in FIG. 1, are adapted to engage the teeth of the gear wheel 21.

The cranked lever is loaded by a spring 28 which in the illustrated example takes the form of a tension spring fastened, on the one hand, to the arm 24 of the cranked lever and, on the other hand, to a pin on the stationary plate member 4. The spring 28 maintains the teeth 23 of the cranked lever and of the gear wheel 21 in engagement. Before the angle of inclination of the back rest can be adjusted the locking device 22 must first be moved into inoperative position. This is done by raising the grip 25 and thus disengaging the teeth 23 from the gear wheel 21 against the pull of spring 28. The back rest of the vehicle seat can then be swung freely into the desired position and, as soon as the grip 25 is released, the spring 28 will retract the locking device 22 embodied in the cranked lever into its locking position. It is an advantage offered by the form of construction of the hinge fitting that it permits the angularity of the back rest to be adjusted within an accuracy of as little as one degree. It should be mentioned that the hinge fitting is further provided with a spring which loads the back rest, said spring not being shown in the drawings. This spring may either be arranged to surround the tube 19 or it may be directly attached to the members of the fitting. In the latter case a useful arrangement is to embody said spring in a torsion spring.

The embodiment of the proposed hinge fitting illustrated in FIGS. 4 and 5 likewise comprises two pairs of plate members 31 and 32, each pair of plate members being articulated together and plate members 31 being firmly attached to the seat by bolts or the like passed through holes 33 and 34 provided in spacing bushes 35 and 36 secured to one of the plate members 31 of the hinge fitting. Corresponding spacing bushes on the other plate member 31 of the hinge fitting have an external thread 37 for mounting a threaded sleeve 38 which has an outwardly projecting flange and permits the effective length of said spacing bushes to be extended, as may be desired, for compensating any tolerations in the dimensions of the parts of the seat itself.

The plate members 31 and 32 are both dished and provided with flanged peripheral edges 39 and 40 respectively for imparting greater rigidity to the same. The pivotally deflectable plate member 32 is secured to the back rest by screws or the like which pass through three holes in the upward extension of said plate member 32, not shown in the drawings. The plate member 32 is pivotally deflectable in relation to the plate member 31 on a pivot pin 41, said pivot pin mounting a fixing plate 42 which is rigidly connected therewith. The fixing plate 42 bears against the outside of the deflectable plate member 32 and is secured thereto by rivets 43 or the like. Moreover, said fixing plate 42 has a projecting edge 44 to form a recess for a cover or cap 45 of elastic material, particularly of a suitable plastic to be clipped over the outside of said fixing plate 42.

A thread 46 on the pivot pin 41 carries a nut 47 forming a bearing bush which passes through a corresponding hole in the fixed plate member 31 of the fitting, in such manner that the pivot pin 41 and the nut 47 can turn in said hole in the stationary plate member 31. The projecting end 48 of the pivot pin 41 is provided with a slot 49 for the reception therein of the off-angled end of a spirally wound pre-loaded spring 50, the external end of said spring being supported by a portion of the stationary plate member 31. The spring 50 is arranged to apply a restoring couple to the deflectable plate member 32 of the fitting and thus to urge the back rest forwardly into its end position when the locking mechanism which is yet to be described has been released.

The plate member 32 contains a curved rack segment 51 formed for instance by two curved sheet metal strips 52, 53 and extending, as shown in FIG. 5 at a distance from and parallel to the inner face 54 of the plate member 32. The curved rack segment 51 is held in position by off-angled edges 55 and 56 at the extremities of the interconnected metal strips 52 and 53 said edges bearing against the inner face 54 and being affixed thereto by riveting, welding, or like means, whereas the outside edge of the rack segment 51 is additionally secured by a weld seam 57 to the flanged edge 40 of the plate member 32.

The teeth of the rack segments 51 each mesh with a pinion 58 which is fast on a shaft 59, for instance being secured thereto by slot and key. The free end of the shaft 59 projecting from the plate members 31 and 32 terminates in a square end 60 and the opposed ends 60 of the two shafts 59 are connected for common rotation by a tube 61 which fits over the respective square ends 60. The assembly thus forms a common shaft 62 which carries the pinions 58 at each of its ends. On one side of the pinion 58 said shaft 59 is rotatably supported in a bearing bush 63 connected with plate member 31 and on the other side of said pinion 58 in the bore of a strap member 64 mounted on the pivot pin 41, the free end 65 of the shaft 59 being axially locked by a circlip 66 which engages a slot. The inner face 54 of the dished plate member 32 is formed with an arcuate embossment 67 forming a trough-like recess for the accommodation of the free end 65 of the pinion shaft 62.

The corresponding teeth of the rack segments 51 in cooperation with the two pinions 58 and pinion shaft 62 establish a connection between one pair of articulated plate members of the hinge fitting and the pair of plates located on the other side of the seat, in such manner that the angular position of inclination of the two plate members 32 will always correspond, whereas the fact that hollow shaft 62 is supported in two bearings prevents the pinion shaft 59 from bending, for instance when the two plate members 32 are called upon to support unequal loads, and from thus causing one of the pinions 58 from becoming disengaged from the teeth of the cooperating rack segment 51.

Fast on one end of the pinion shaft 62 is a gear wheel 68, the central non-circular bore of said gear wheel corresponding for instance with a like section of the shaft. The diameter of this gear wheel 68 exceeds that of pinion 58 and the gear wheel 68 is arranged to cooperate with locking means comprising a locking lever 69 and an actuating lever 70. The locking lever 69 is rotatably mounted on the pivot pin 41 and has a downwardly extending arm 71 with tooth-like formations 72 for engagement of the teeth of gear wheel 68 and thus arresting the same. An upwardly extending arm 73 of said locking lever 69 has a guide slot 74 engaged by a projecting pin 75 on the actuating lever 70 which pivots on a fulcrum 76, and which is loaded by a spring 77 embodied in a tension spring fastened, on the one hand, to the actuating lever 70 and, on the other hand, to a lug 78 projecting from the inner face of the dished plate member 31 and at the same time providing an abutment for limiting the deflection of the arm 71 of said locking lever 69. The spring 77 is always under tension and therefore continuously urges the actuating lever 70 into the position shown in FIG. 4. In order to achieve an especially compact form of construction and, more particularly, to permit the actuating lever 70 to be conveniently operated, the latter has an arm 79 extending downwards to the level of the plate member 31 and terminating for instance in a grip in the shape of a knob 80.

When it is desired to re-adjust the angular inclination of the back rest the actuating lever 70 must first be deflected, in FIG. 4 in the clockwise direction, about the fulcrum 76 against the pull of the spring 77. This causes pin 75 to be shifted in the guide slot 74 and the locking lever 69 likewise to be deflected clockwise about the pin 41 until the arm 71 comes to rest against the lug 78 which thus limits the deflections of the locking lever 69 as well as of the actuating lever 70, with the result that the tooth-like formations 72 at the lower end of the arm 71 are withdrawn from engagement with the teeth of the gear wheel 68. The plate member 32 of which the forward angle of tilt is likewise limited by the lug 78 is now free to be adjusted together with the back rest, forward deflection being spontaneous by the action of the spring 50, whereas rearward deflection must be effected by the application of external effort, for instance by the person occupying the seat pushing the back rest to the rear with his back against the counter-pressure of the spring 50. When the back rest is in the desired position of angularity the grip 80 is released and the spring 77, acting through the actuating lever 70 on the pin 75, will then cause reengagement of the tooth-like formations 72 on the locking lever 69 with the teeth of the gear wheel 68. It will be readily understood that by using the gear wheel 68 of very much larger diameter than that of the pinions a very fine, practically infinitely variable, angular adjustability of the back rest to within about 1° can be achieved.

To prevent the covering of the seat and especially of the back rest from being damaged by the sharp edges 82 of the flanged edge 39 of the stationary plate member 31, the region of said edge adjacent the upholstery of the parts of the seat are covered by a substantially dish-shaped capping 83 which has well-rounded edges 84, 85 and which at the same time provides an external protection for the functional parts of the hinge fitting, such as pivot pin 48, spring 50 and so forth. The upholstery is therefore well protected from damage and from being soiled.

It will be readily understood that the described forms of construction are merely illustrative of the invention. Many modifications can be devised for numerous other applications within the scope of the present invention. A possible modification consists, for example, in supporting the pinion shaft 59 in two bearings of some other form of construction, and the locking lever 69 and the actuating lever 70 may be contrived in some other way. Moreover, it would be quite possible to associate a locking device and a gear wheel with each pair of the articulated plate members of the hinge fitting, instead of providing the same on only one side of the seat as described in the foregoing examples of construction.

We claim:

1. A locking arrangement for adjustable seat back rests, comprising, in combination, a fixed seat support element; a back rest element; pivot means connecting said elements for free turning movement of said back rest element about a pivot axis; gear means secured to said back rest element concentric with said pivot axis; pinion means mounted on said seat support element for turning movement about an axis parallel to said pivot axis and meshing with said gear means; locking wheel means having locking teeth about the periphery thereof and being fixedly secured to said pinion means for turning movement with the same, said locking wheel means having a greater diameter than said pinion means; and locking lever means mounted on said seat support element for movement between a locking position and an inoperative position, and having a part matching said locking teeth of said locking wheel means and engaging the same in said locking position for locking said back rest element in angular positions angularly displaced relative to said seat support element, said angular positions being spaced in accordance with the shape and spacing of said locking teeth.

2. A locking arrangement for adjustable seat back rests, comprising, in combination, a fixed seat support element; a back rest element; pivot means connecting said elements for free turning movement of said back rest element about a pivot axis; gear means secured to said back rest element concentric with said pivot axis; pinion means mounted on said seat support element for turning movement about an axis parallel to said pivot axis and meshing with said gear means; locking wheel means having locking teeth about the periphery thereof and being fixedly secured to said pinion means for turning movement with the same, said locking wheel means having a greater diameter than said pinion means; and locking means including a locking lever turnably mounted on said support element for movement between an inoperative position and a locking position, and having a part matching said locking teeth of said locking wheel and engaging the same in said locking position, and a manually operated lever pivotally mounted on said support element and operatively connected to and actuating said locking lever so that operation of said manually operated lever effects movement of said locking lever between said inoperative position and said locking position, said locking lever locking said back rest element in a plurality of angular positions angularly displaced relative to said seat support element corresponding to the shape and spacing of said locking teeth of said locking wheel means.

3. A locking arrangement for adjustable seat back rests, comprising, in combination, a pair of seat support members; a pair of back rest members; a pair of pivot means respectively connecting said back rest members with said seat support members for turning movement about a pivot axis; a pair of part-circular rack bar segments respectively secured to said back rest members concentric with said pivot axis; a pair of pinions respectively mounted on said seat support members for turning movement about an axis parallel to said pivot axis and respectively meshing with said rack bar segments; shaft means connecting said pinions with each other for turning movement; locking wheel means operatively connected to said pinions for turning movement with said pinions and having locking teeth about the periphery thereof; and locking means including a double-armed locking lever turnably mounted on one of said seat support members and having an arm formed with locking teeth and another arm formed with a guide slot, said locking lever being turnable between an operative position and a locking position in which said locking teeth thereof engage said locking teeth of said locking wheel means for locking said back rest members in angular positions angularly displaced relative to said seat support members corresponding to the shape and spacing of said locking teeth of said locking wheel means, and a manually operated lever having a pin located in said guide slot so that operation of said manually operated lever effects movement of said locking lever between said inoperative and locking positions.

4. A locking arrangement as set forth in claim 3 wherein said manually operated lever is curved and has a grip portion at the free end thereof located below the level of said seat support members.

References Cited in the file of this patent

UNITED STATES PATENTS

| | | |
|---|---|---|
| 2,784,770 | Herr | Mar. 12, 1957 |

FOREIGN PATENTS

| | | |
|---|---|---|
| 373,207 | Italy | July 21, 1939 |
| 926,053 | Germany | Apr. 4, 1955 |
| 1,100,938 | France | Apr. 13, 1955 |
| 931,033 | Germany | July 28, 1955 |
| 1,034,990 | Germany | July 24, 1958 |